United States Patent
Ruman et al.

[11] Patent Number: 5,826,556
[45] Date of Patent: Oct. 27, 1998

[54] ENGINE LUBRICATION CIRCUIT WITH ALTERNATING LUBRICATION PATHS

[75] Inventors: Mark A. Ruman, Fond du Lac; George D. Idzikowski, Lomira, both of Wis.

[73] Assignee: Brunswick Corporation, Lake Forest, Ill.

[21] Appl. No.: 847,294

[22] Filed: Apr. 24, 1997

[51] Int. Cl.$^6$ .................................................. F01M 1/00
[52] U.S. Cl. .................................. 123/196 W; 123/70 D
[58] Field of Search ........................ 123/196 R, 196 W, 123/70 D

[56] References Cited

U.S. PATENT DOCUMENTS

| | | | |
|---|---|---|---|
| 5,287,833 | 2/1994 | Yashiro | 123/196 |
| 5,355,851 | 10/1994 | Kamiya | 123/196 R |
| 5,370,089 | 12/1994 | Harada | 123/73 AD |
| 5,375,573 | 12/1994 | Bowman | 123/196 R |
| 5,513,608 | 5/1996 | Takashima | 123/196 |

*Primary Examiner*—John T. Kwon
*Attorney, Agent, or Firm*—William D. Lanyi

[57] ABSTRACT

A lubrication system for an internal combustion engine directs a dedicated flow of oil to the cylinder bores of an engine. In addition, a more traditional oil circuit is provided to lubricate the components within the crankcase of the engine. A 2-way valve is used to alternate the flow of oil from an oil pump through the two alternative circuits according to a duty cycle that is selected as a function of a pre-selected engine parameter. The engine parameter, in a typical application, is shaft speed or rpm. By directing oil to the cylinder bores at a higher duty cycle when the engine speeds are low, the pistons are adequately lubricated when, otherwise, the low engine speed could cause difficulty in providing a proper flow of lubricant to the cylinder bores.

16 Claims, 4 Drawing Sheets

ENGINE LUBRICATION CIRCUIT WITH ALTERNATING LUBRICATION PATHS

BACKGROUND OF THE INVENTION

1. Field of the Invention

The present invention is generally related to a lubrication system for an internal combustion engine and, more particularly, to a dual path lubrication system wherein the two discreet lubrication paths are controlled according to a duty cycle that is a function of a pre-selected engine parameter, such as drive shaft rotation speed.

2. Description of the Prior Art

Internal combustion engines require lubrication to prevent damage due to excessive wear of their moving parts. In certain engines, lubricant is introduced into an air/fuel stream as it enters the crankcase of the engine through reed valves. Alternatively, the lubricant can be caused to flow onto rotating parts of the engine within the crankcase. Other alternative lubrication systems can introduce oil directly through a cylinder wall and in fluid communication with the region at the interface between the outer surface of a piston and the inner surface of the cylinder wall. These and other techniques for introducing a lubricant into an internal combustion engine are well known to those skilled in the art.

U.S. Pat. No. 5,513,608, which issued to Takashima et al on May 7, 1996, discloses a two cycle engine lubricating system. It describes a lubricating system for a reciprocating machine, such as a two cycle internal combustion engine which has the cylinder bores horizontally disposed. A drain system is provided for draining lubricant from the lower most crankcase chambers to the upper cylinders so as to maintain uniformity of lubrication and ensure both even and smooth running. A check valve is provided for precluding reverse flow and a lubricant is delivered both to the crankcase chambers and to the piston through either the piston and/or cylinder liner. The lubricant supplied to the piston is supplied at its upper area so as to ensure complete lubrication of its circumference and of the associated cylinder bore.

U.S. Pat. No. 5,287,833, which issued to Yashiro on Feb. 22, 1994, describes a lubricating oil supplying system for a two cycle engine. The system includes a reciprocating engine drive lubricant pump, and a solenoid controlled bypass valve for selectively delivering lubricant to the engine by bypassing it back to the inlet side of the lubricant pump to control the amount of lubricant supplied to the engine. The duty cycle of the solenoid is increased as the engine speed is decreased and the duty cycle is also decreased when the throttle is opened rapidly so as to ensure the proper amount of lubricant flow to the engine under all conditions, both transient and steady state.

Since outboard motors are typically run over a wide range of speeds, from approximately 550 rpm at idle to approximately 5500 rpm at wide open throttle, the lubrication requirements for the motor change significantly. For example, at low speeds and low loads the air flow into the engine is much less than at full open throttle. As the air flow into the engine is decreased, its utility as a carrier of oil in the crankcase is significantly diminished. When the air velocities in the crankcase are reduced, the oil tends to fall out of suspension in the air stream and form puddles in the bottom portion of the crankcase. For this reason, it is very difficult to properly lubricate the cylinder bore under low speed and low load conditions using only the air flow to carry the lubricant. On the other hand, at high speeds where the outboard motor is at wide open throttle, the air flow through the crankcase is sufficient to adequately distribute oil mist throughout the moving parts of the crankcase and to the cylinder bore.

One possible response to this problem could be to provide a multiport pump for these purposes. However, the flow from the ports of the pump would have to be decreased significantly so as to avoid increasing the overall oil delivery to the engine. It is often difficult to properly meter such small quantitites and, therefore, some source of flow distribution system is desirable. Another problem with the use of a multiport pump is that the percentage of fuel distributed through the various ports is fixed in all cases. In addition, multiport pumps are more expensive than the type of oil pumps that are typically used in these types of applications.

It would therefore be significantly beneficial if a means was provided to distribute the oil throughout the internal combustion engine as a function of an engine parameter that provides additional lubrication to the cylinder bores at low speed and increased lubrication of the moving parts within the crankcase at high speeds.

SUMMARY OF THE INVENTION

A preferred embodiment of the present invention comprises a lubricant pump and a valve which has an inlet connected in fluid communication with the lubricant pump for receiving lubricant from the pump. The valve has a first outlet and a second outlet. The first outlet is connected in fluid communication with a crankcase region of the internal combustion engine and the second outlet is connected in fluid communication with a cylinder wall opening within the internal combustion engine.

The lubrication system further comprises a means for directing all of the lubricant from the inlet sequentially to both the first and second outlets based on a duty cycle which is determined as a function of a pre-selected engine parameter. The engine parameter, in a particularly preferred embodiment of the present invention, is the rotational speed of the driveshaft of the engine. In addition, the engine parameter can be the physical position of a throttle associated with the engine.

The lubrication system, in a particularly preferred embodiment, further comprises an air compressor connected with fluid communication with the lubricant pump from receiving the lubricant therefrom. The air compressor provides a flow of air to the engine and the air compressor has an inlet to receive oil from a drain conduit of the engine.

Although the present invention can be used in internal combustion engines of various types, it is particularly intended for use in a marine engine such as an outboard motor. Although the present invention can be incorporated in a single cylinder of an engine, a typical application is in an internal combustion engine that comprises a plurality of cylinders and the second outlet is connected in fluid communication with a plurality of cylinder wall openings, wherein each of the plurality of cylinder wall openings is associated with one of a plurality of cylinders.

BRIEF DESCRIPTION OF DRAWINGS

The present invention will be more fully and completely understood from the reading of the description of the preferred embodiment in conjunction with the drawings, in which.

DESCRIPTION OF PREFERRED EMBODIMENT

Figure 1:
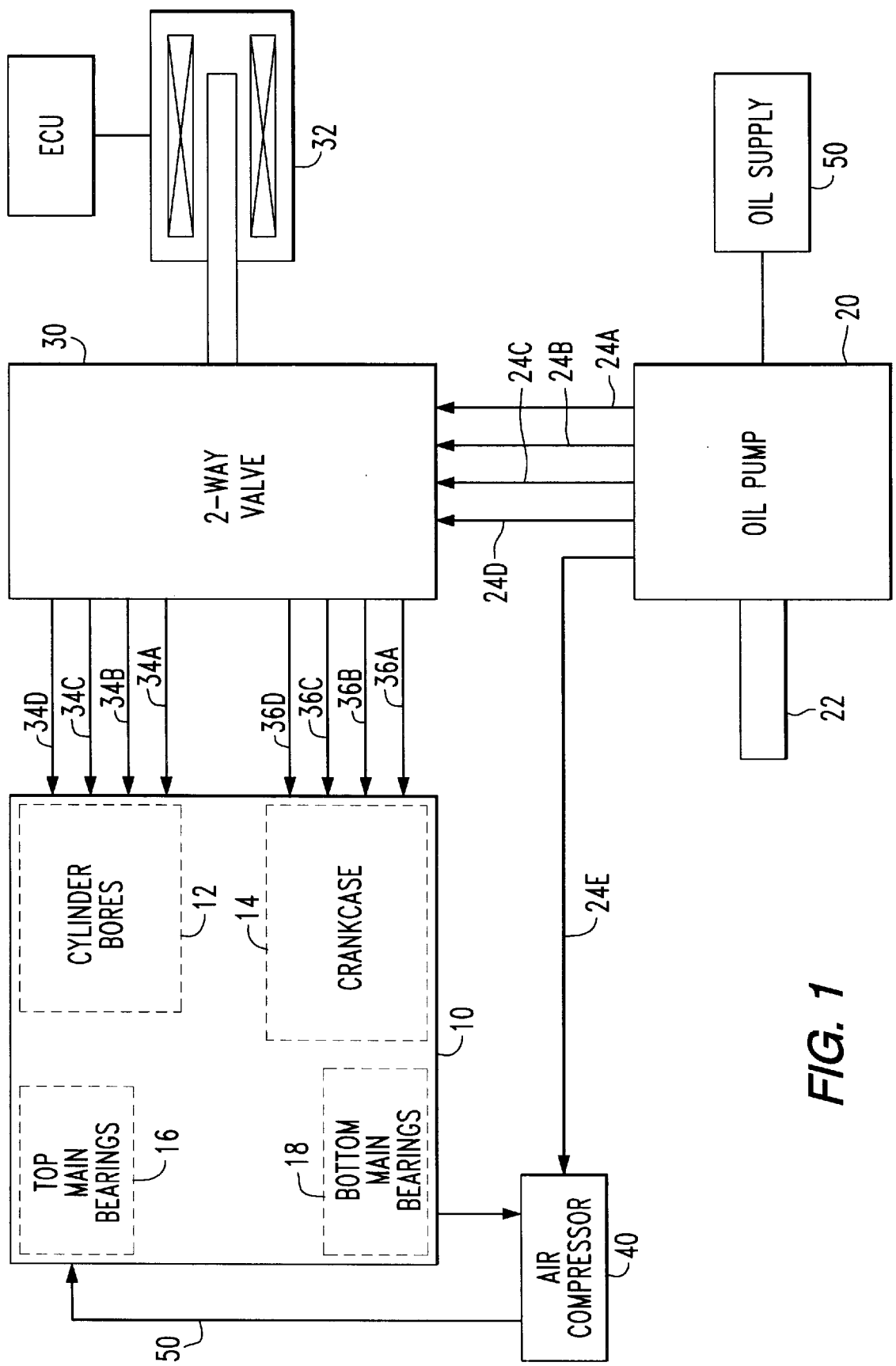
FIG. 1 is a schematic representation of an engine incorporating the concept of the present invention.

Throughout the description of the preferred embodiment, like components will be identified by like reference numerals. FIG. 1 is a highly schematic representation of an internal combustion engine 10. Within the illustration of the internal combustion engine, four specific areas are identified in dashed line boxes. These areas are the cylinder bores 12, the crankcase 14, the top portion, or induction manifold, of the engine 16 and the bottom drain 18. An oil pump 20, which is driven by a rotatable shaft 22, provides a pressurized flow of lubricant to five conduits, 24A–24E. As shown in FIG. 1, four of these conduits are connected to a 2-way valve 30 which, in a particularly preferred embodiment of the present invention, is a solenoid controlled rotary valve. The solenoid 32 is connected to the valve is such a way that it can rotatably select one of the two outlets which can be connected with fluid communication with the inlets of the valve 30. When in a first position, the fluid is directly through the 2-way valve from conduits 24A–24D to outlet conduits 34A–34D. This directs the oil from the oil pump 20 through the 2-way valve 30 and to the cylinder bores 12 of the internal combustion engine 10. Each of the conduits 34A–34D is associated with one of the cylinder bores. When the solenoid valve is moved to its alternative position, the oil from conduits 24A–24D are directed to outlet conduits 36A–36D and the oil flows to the crankcase 14 of the internal combustion engine 10. Each of the conduits 36A–36D is associated with a specific region of the crankcase.

With continued reference to FIG. 1, it can be seen that a conduit 24E from the oil pump 20 is directed to an air compressor 40 to provide lubrication of the air compressor. The oil received by the air compressor 40 from conduit 24E is mixed with the air provided at the outlet of the air compressor 40 and directed, as represented by arrow 50, to the top portion 16 of the internal combustion engine. As oil drains through the engine and eventually collects in the bottom portion of the engine, a bottom drain 18 provides a means for returning the oil to the air compressor 40. The oil pump 20 receives new oil from an oil supply 50.

Figure 2:
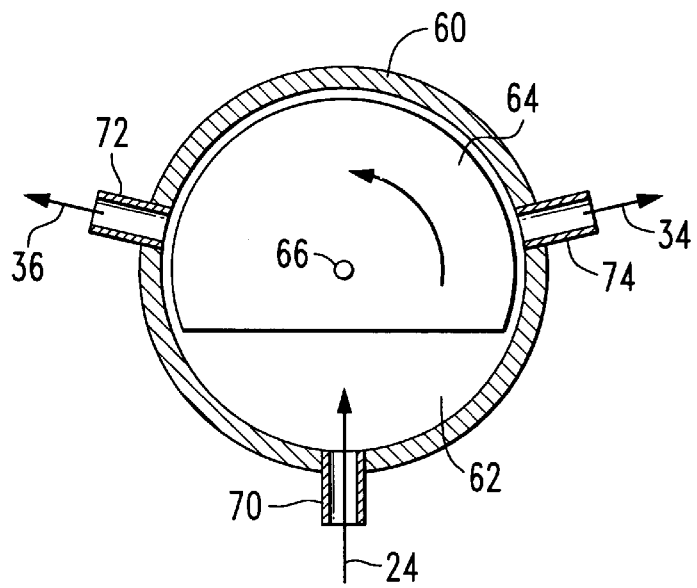
FIG. 2 is a sectional view taken through a 2-way valve that can be used in conjunction with the present invention.

FIG. 2 is a section view through an exemplary 2-way valve that could be used in conjunction with the present invention. It should be understood that many different types of valves can be used for these purposes, but the exemplary valve shown in FIG. 2 comprises a housing 60 which contains an inner bore 62. A rotatable shaft 64 is rotatively supported for movement about the central axis 66. It should be understood that the shaft 64 would typically be restrained to a specific degree of motion back and forth between predefined limits. An inlet port 70 receives the flow of oil from the oil pump 20, as described above, and directs it into the space within the housing 60. Arrow 24 in FIG. 2 represents one of the arrows 24A–24D in FIG. 1. It should also be understood that each of the arrows, 24A–24D, 34A–34D, and 36A–36D directs flow intended for an associated cylinder or an associated location within the crankcase of the engine. A first outlet 72 is provided to direct flow 36 toward the locations within the crankcase of the internal combustion engine 10. A second outlet 74 directs flow 34 to the cylinder bores 12 of the internal combustion engine. In operation, the shaft 64 is rotated clockwise or counterclockwise to expose the outlets, 72 and 74, sequentially. It should be noted that only one of the two outlets, 72 and 74, is connected in fluid communication with the inlet 70 and the space 62 at any one time. In other words, if oil is flowing through outlet 72, it is not flowing through outlet 74. Similarly, if oil is flowing from outlet 74, it is not flowing from outlet 72. That means that the oil flow to the cylinder bores 12 and the crankcase 14 are sequential through the normal operation of the pump shown in FIG. 2.

Figure 3:
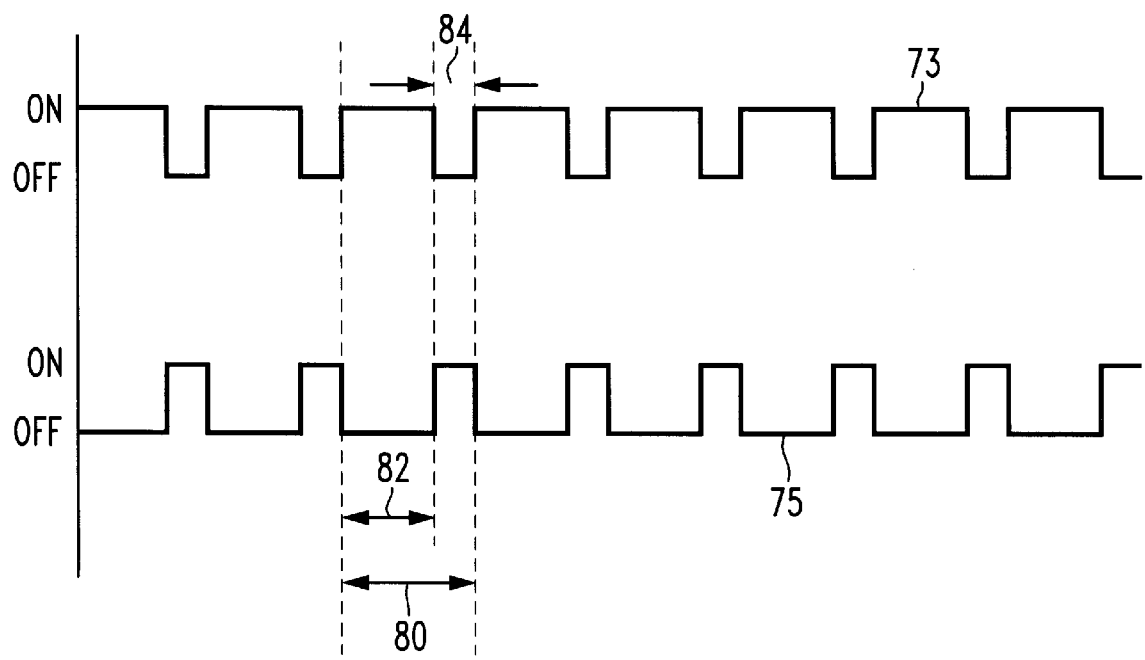
FIG. 3 is a time-based graphical representation of the duty cycles for two oil circuits in an internal combustion engine.

FIG. 3 graphically represents the operations of outlets 72 and 74 in FIG. 2 along a time line with patterns 73 and 75, respectively. In a preferred embodiment of the present invention, the 2-way valve 30 shown in FIG. 1 is moved back and forth between its extreme positions by providing electrical current to the solenoid 32 in directions that are determined by a duty cycle that is a function of a preselected engine parameter, such as rotational speed of the driveshaft. First, a period of time 80 is chosen as a complete cycle which will be divided between oil circuit 34 and oil circuit 36. Since the time period 80 remains generally constant through the operation of the present invention, an increase in the time when oil flows through outlet 72 will result in a decrease in the time that oil flows through outlet 74. In FIG. 3, reference numeral 82 represents the time that oil flows through outlet 72 to the cylinder bores 12 and reference numeral 84 represents the time that oil flows through outlet 74 to the crankcase 14 of the engine 10. In other words, the duty cycle for each outlet, 72 and 74, is determined by the electrical signals provided to the solenoid 32. These duty cycles shown graphically in FIG. 3 also represent the time the shaft 64 in FIG. 2 is at its most clockwise position and the time that the shaft 64 is at its most counterclockwise position. In this way, a change in the duty cycle can be used to redistribute the flow of oil to the various engine compartments. If the engine is controlled electronically, the electronic control unit (ECU) could monitor an engine parameter such as shaft speed and provide signals to the solenoid 32 based on a predetermined relationship between the duty cycles for both outlets of the valve and the selective engine parameter.

Figure 4:
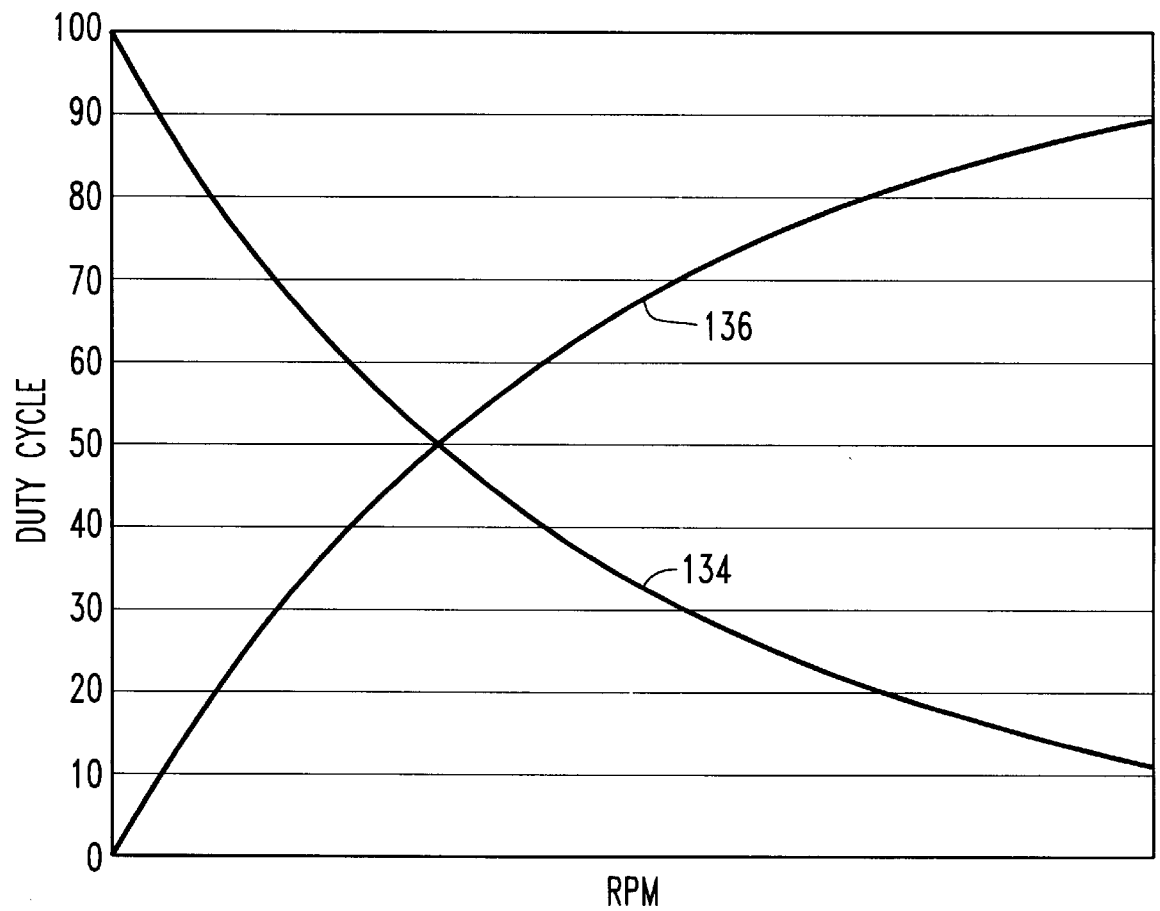
FIG. 4 is a graphical representation of the two duty cycles, as a percentage, graphically represented as a function of engine speed.

FIG. 4 is a graphical representation of the duty cycle, shown as a percent of the total time period 80 in FIG. 3, for the two oil flows. Line 134 in FIG. 4 represents the duty cycle for the outlet 74 in FIG. 2 which provides an oil flow 34 to the cylinder bores 12 as represented by arrows 34A–34D in FIG. 1. In FIG. 4, line 136 represents the duty cycle of oil flow 36 through outlet 72 in FIG. 2 which is. represented by arrows 36A–36D in FIG. 1. As can be seen in FIG. 4, an increase in the duty cycle of line 136 is associated with the corresponding decrease in the duty cycle of line 134 since the time period 80 described above in conjunction with FIG. 3 remains constant.

With continued reference to FIG. 4, it can be seen that when the engine is at very low rpm, virtual all of the oil is directed to the cylinder bores as represented by line 134. This relationship is the result of the fact that at low speed the movement of components within the crankcase and the flow of air through the crankcase is generally insufficient to guarantee an adequate flow of oil to the cylinders. Therefore, oil is pumped directly through the conduits 34A–34D to the cylinder bores as represented by arrows 34A–34D in FIG. 1. As rotational speed of the driveshaft increases, the duty cycle is modified by the electronic control unit (ECU) to increase the duty cycle of outlet 72 in FIG. 2 and decrease the duty cycle of outlet 74 in FIG. 2. In other words, more oil is directed through lines 36A–36D in FIG. 1 to the crankcase and less oil is directed to the cylinder bores 12. These relationships are graphically represented in FIG. 4.

Figure 5:
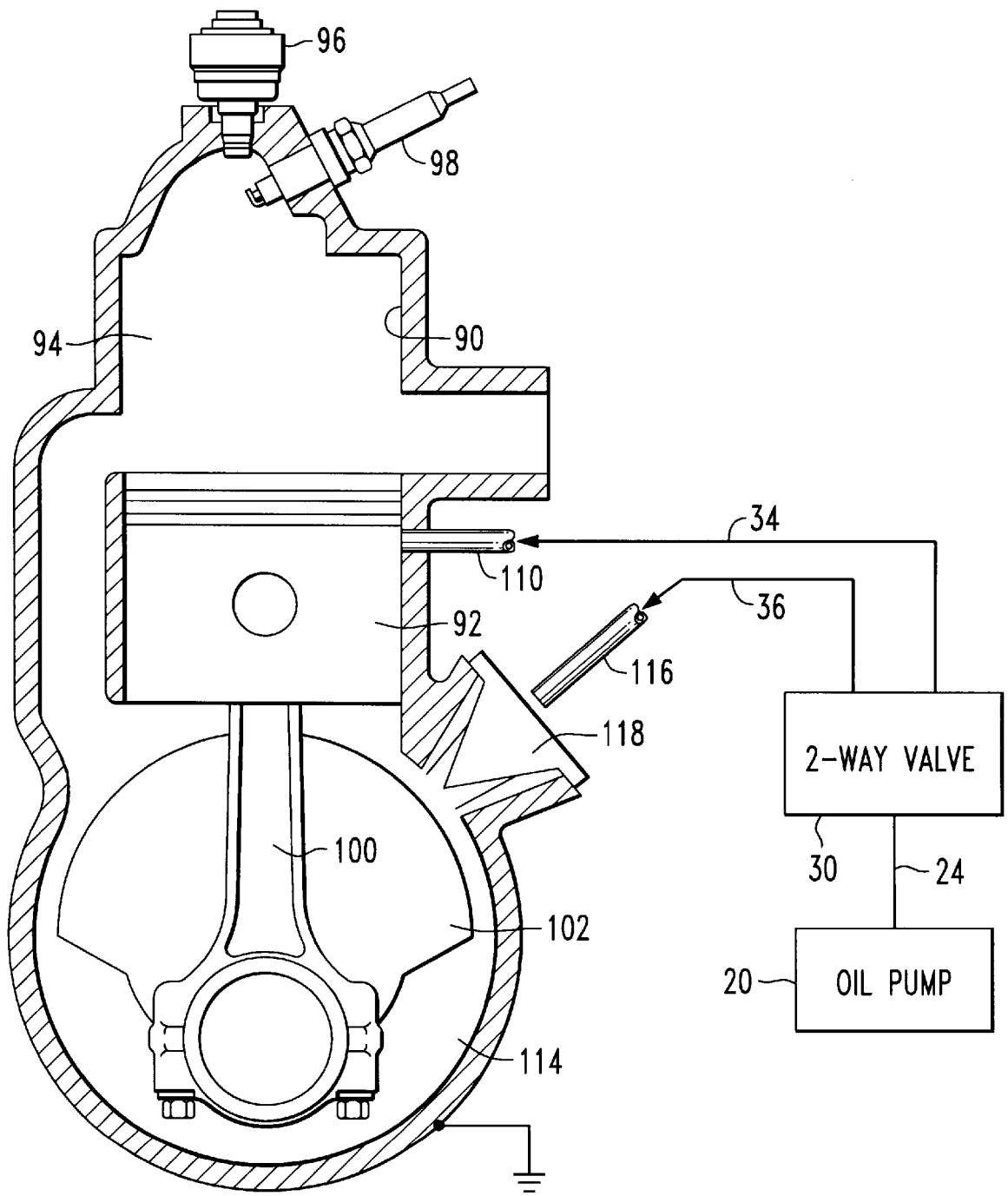
FIG. 5 is a sectional view taken through a cylinder bore of an engine.

FIG. 5 shows a sectional view of an internal combustion engine taken through one of the cylinder bores 90. The cylinder bore 90 is shaped to receive piston 92 in sliding relation therein. In certain types of internal combustion engines, fuel is injected into the combustion chamber 94 by an injector 96 and ignited by a spark plug 98. The piston 92 is caused to move reciprocally within the cylinder bore 90 by the motion of a connecting rod that is connected eccentrically to a crankshaft 102.

With continued reference to FIG. 5, a conduit 110 is provided to direct the flow 34 of oil from the valve 30 to the cylinder bore 90. The opening in the cylinder bore 90, in a particular preferred embodiment of the present invention, is located just below the point of maximum travel of the piston 92 in the direction away from the spark plug 98. This assures that the oil flowing to the cylinder bore 90 does not enter directly into the combustion chamber 94 but, instead, serves to lubricate the movement of the piston 92 within the cylinder bore 90 with the excess oil being combined with the oil in the crankcase 114.

With continued reference to FIG. 5, the other oil circuit 36 directs oil through a conduit 116 to the reed valves 118 that regulate the flow of air and fuel vapor into the crankcase 114. The oil flow 36 is combined with the air or air/fuel mixture in order to lubricate the moving components within the crankcase 114. It should be understood that the flow 36 could alternatively be directed into the crankcase 114 at other locations that would cause the oil to flow more directly to certain pre-selected moving components. The specific location where the oil flow 36 is introduced into the crankcase 114 is not limiting to the present invention. Instead, it should be understood that oil flow 36 is intended to provide lubrication to the components within the crankcase while oil flow 34 is intended to provide lubrication directly to the cylinder wall lining. It should also be understood that these two oil flows 34 and 36, are controlled so that they occur sequentially according to a pre-selected duty cycle as described above in conjunction with FIG. 3.

By monitoring the speed of the engine, an electronic control unit (ECU) can provide signals to the solenoid 32 which change the duty cycle between the two oil flows, 34 and 36, so that the cylinder bores 12 and the crankcase 14 can receive lubricant at a rate that is determined directly by the speed of the engine. They sequentially share the total flow of oil through conduits 24A–24D according to this duty cycle.

Although the present invention has been described with particular detail and illustrated with specificity to show a particular preferred embodiment of the present invention, it should be understood that many other terms of embodiments are within its scope. For example, the relationship of the air compressor 40 with the other components in FIG. 1 is not required in all the embodiments of the present invention. Similarly, the concept of the present invention can be used even through no electronic controlled unit (ECU) is provided. The valve 30 could be mechanically actuated or, alternatively, connected to the throttle linkage or oil pump linkage of the engine. The present invention allows significantly improved oil delivery control in certain direct fuel injection two-stroke engines. The valve 30 controls the distribution of the oil from the oil pump 20 to the two circuits, 34A–34D and 36A–36D. The control of the valve 30 can be in response to engine speed, throttle position, or any other suitable engine parameter. The valve 30 can be electrically or mechanically controlled. Distributing the oil among the multiple circuits allows a more complete lubrication of the engine. The present invention solves the problem of lubricating the cylinder bores of two-stroke direct fuel injection engines at low speeds and loads. This difficulty is due to an inability to completely atomize the oil effectively in the crankcase because of reduced air flow velocities in the crankcase. This problem is also due to extremely low oil delivery rates at low engine speeds. The present invention dedicates an oil delivery circuit to the cylinder bores to eliminate this problem and a second oil circuit is dedicated to delivering oil to the crankcase. The second circuit is used primarily at high speeds and high loads where traditional delivery locations to the rods, bearings or reed block are known to be effective at high engine speeds.

We claim:

1. A lubrication system for an internal combustion engine, comprising:

a lubricant pump;

a valve having an inlet connected in fluid communication with said lubricant pump for receiving lubricant from said pump, said valve having a first outlet and a second outlet, said first outlet being connected in fluid communication with a crankcase region of said engine, said second outlet being connected in fluid communication with a cylinder wall opening of said engine, said internal combustion engine being a marine engine;

a controller for causing said valve to direct all of said lubricant from said inlet sequentially to said first and second outlets based on a duty cycle which is determined as a function of a preselected engine parameter; and an air compressor connected in fluid communication with said lubricant pump for receiving said lubricant therefrom, said air compressor providing a flow of air to said engine, said air compressor having an inlet to receive oil from a drain conduit of said engine.

2. The lubrication system of claim 1, wherein:

said engine parameter is the rotational speed of a driveshaft of said engine.

3. The lubrication system of claim 1, wherein:

said engine parameter is a position of a throttle associated with said engine.

4. The lubrication system of claim 1, wherein:

said engine is an outboard motor.

5. The lubrication system of claim 1, wherein:

said internal combustion engine comprises a plurality of cylinders; and said second outlet is connected in fluid communication with a plurality of said cylinder wall openings, each of said plurality of said cylinder wall openings being associated with one of said plurality of cylinders.

6. A lubrication system for an internal combustion engine, comprising:

a lubricant pump;

a valve having an inlet connected in fluid communication with said lubricant pump for receiving lubricant from said pump, said valve having a first outlet and a second outlet, said first outlet being connected in fluid communication with a crankcase region of said engine, said second outlet being connected in fluid communication with a cylinder wall opening of said engine;

a controller for causing said valve to direct all of said lubricant from said inlet sequentially to said first and second outlets based on a duty cycle which is determined as a function of a preselected engine parameter; and an air compressor connected in fluid communication with said lubricant pump for receiving said lubricant therefrom, said air compressor providing a flow of air to said engine, said air compressor having an inlet to receive oil from a drain conduit of said engine.

7. The lubrication system of claim 6, wherein:

said engine parameter is the rotational speed of a driveshaft of said engine.

8. The lubrication system of claim 6, wherein:

said engine parameter is a position of a throttle associated with said engine.

9. The lubrication system of claim 6, wherein:

said engine is a marine engine.

10. The lubrication system of claim 9, wherein:

said engine is an outboard motor.

11. The lubrication system of claim 6, wherein:

said internal combustion engine comprises a plurality of cylinders; and said second outlet is connected in fluid communication with a plurality of said cylinder wall openings, each of said plurality of said cylinder wall openings being associated with one of said plurality of cylinders.

12. A lubrication system for an internal combustion engine of an outboard motor, comprising:

a lubricant pump;

a valve having an inlet connected in fluid communication with said lubricant pump for receiving lubricant from said pump, said valve having a first outlet and a second outlet, said first outlet being connected in fluid communication with a crankcase region of said engine, said second outlet being connected in fluid communication with a cylinder wall opening of said engine, said engine being a marine engine;

means for directing all of said lubricant from said inlet sequentially to said first and second outlets based on a duty cycle which is determined as a function of a preselected engine parameter; and an air compressor connected in fluid communication with said lubricant pump for receiving said lubricant therefrom, said air compressor providing a flow of air to said engine, said air compressor having an inlet to receive oil from a drain conduit of said engine.

13. The lubrication system of claim 12, wherein:

said engine parameter is the rotational speed of a driveshaft of said engine.

14. The lubrication system of claim 12, wherein:

said engine parameter is a position of a throttle associated with said engine.

15. The lubrication system of claim 12, wherein:

said engine is an outboard motor.

16. The lubrication system of claim 12, wherein:

said internal combustion engine comprises a plurality of cylinders; and said second outlet is connected in fluid communication with a plurality of said cylinder wall openings, each of said plurality of said cylinder wall openings being associated with one of said plurality of cylinders.

* * * * *